(12) United States Patent
Piao (10) Patent No.: US 12,272,093 B2
(45) Date of Patent: *Apr. 8, 2025

(54) INFORMATION PROCESSING APPARATUS, CONTROL METHOD, AND NON-TRANSITORY STORAGE MEDIUM

(71) Applicant: NEC Corporation, Tokyo (JP)

(72) Inventor: Jun Piao, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/528,904

(22) Filed: Dec. 5, 2023

(65) Prior Publication Data

US 2024/0104769 A1 Mar. 28, 2024

Related U.S. Application Data

(63) Continuation of application No. 17/949,376, filed on Sep. 21, 2022, now Pat. No. 11,887,331, which is a (Continued)

(51) Int. Cl.
*G06T 7/73* (2017.01)
*G06V 10/20* (2022.01)
(Continued)

(52) U.S. Cl.
CPC .............. *G06T 7/73* (2017.01); *G06V 10/255* (2022.01); *G06V 10/764* (2022.01); *G06V 40/10* (2022.01);
(Continued)

(58) Field of Classification Search
CPC ............. G06T 7/73; G06T 2207/20081; G06T 2207/30196; G06V 40/10; G06V 10/255; G06V 10/764
See application file for complete search history.

(56) References Cited

U.S. PATENT DOCUMENTS 11,887,331 B2 * 1/2024 Piao .................... G06V 10/255
2010/0086213 A1 4/2010 Momoi et al.
(Continued)

FOREIGN PATENT DOCUMENTS

CN 116959045 A * 10/2023
JP 2008-269182 A 11/2008
(Continued)

OTHER PUBLICATIONS

JP Official Communication for JP Application No. 2023-122331, mailed on May 7, 2024 with English Translation.
(Continued)

*Primary Examiner* — Pinalben Patel
(74) *Attorney, Agent, or Firm* — Sughrue Mion, PLLC (57) ABSTRACT

An information processing apparatus (2000) detects one or more candidate regions (22) from a captured image (20) based on an image feature of a target object. Each candidate region (22) is an image region that is estimated to represent the target object. The information processing apparatus (2000) detects a person region (26) from the captured image (20) and detects an estimation position (24) based on the detected person region (26). The person region (26) is a region that is estimated to represent a person. The estimation position (24) is a position in the captured image (20) where the target object is estimated to be present. Then, the information processing apparatus (2000) determines an object region (30), which is an image region representing the target object, based on each candidate region (22) and the estimation position (24).

30 Claims, 9 Drawing Sheets

Related U.S. Application Data continuation of application No. 17/048,235, filed as application No. PCT/JP2018/017031 on Apr. 26, 2018, now Pat. No. 11,610,385.

(51) Int. Cl.
*G06V 10/764* (2022.01)
*G06V 40/10* (2022.01)

(52) U.S. Cl.
CPC .............. *G06T 2207/20081* (2013.01); *G06T 2207/30196* (2013.01)

(56) References Cited

U.S. PATENT DOCUMENTS

| | | | |
|---|---|---|---|
| 2012/0275642 A1 | 11/2012 | Aller | H04N 1/32203 382/100 |
| 2013/0155229 A1 | 6/2013 | Thornton | G06V 20/58 348/143 |
| 2014/0071308 A1 | 3/2014 | Cleplinski | G06T 7/73 346/222.1 |
| 2018/0253597 A1 | 9/2018 | Kozakaya | |
| 2018/0300540 A1 | 10/2018 | Swisher | G06N 3/08 |
| 2020/0151489 A1 | 5/2020 | Sriram et al. | |
| 2021/0375045 A1 | 12/2021 | Cao | G06T 19/20 |

FOREIGN PATENT DOCUMENTS

| | | |
|---|---|---|
| JP | 2010-086482 A | 4/2010 |
| JP | 2012-133665 A | 7/2012 |
| JP | 2013-065156 A | 4/2013 |
| JP | 2014-160394 A | 9/2014 |
| JP | 2015-046071 A | 3/2015 |
| JP | 2015-176227 A | 10/2015 |
| JP | 2016-162414 A | 9/2016 |
| JP | 2017-016344 A | 1/2017 |
| JP | 2017-028561 A | 2/2017 |
| JP | 7331910 B2 | 8/2023 |

OTHER PUBLICATIONS

International Search Report corresponding to PCT/JP2018/017031 mailed Jul. 17, 2018 (one page).
Zhe Cao, et al., "Realtime Multi-Person 2D Pose Estimation using Part Affinity Fields", the Robotics Institute, Carnegie Mellon University, Apr. 14, 2017 (9 pages).
US Notice of Allowance for U.S. Appl. No. 17/048,235, mailed on Nov. 8, 2022.
JP Office Action for JP Application No. 2021-197557, mailed on Jan. 17, 2023 with English Translation.
Yasuhiro Asai et al., "A study on detection of the type of a baggage utilizing multiple-viewpoints human images", IEICE Technical Report, A computer vision and image media (CVIM), 2015-CVIM-195 [online], The Institute of Electronics, Information and Communication Engineers, 2015, Japan.
Japanese Office Action for JP Application No. 2021-197557, mailed on Apr. 18, 2023 with English Translation.
JP Office Communication for JP Application No. 2024-084545, mailed on Feb. 12, 2025 with English Translation.

* cited by examiner

CANDIDATE REGION 22-1 INCLUDING ESTIMATION
POSITION 24 IS DETERMINED AS OBJECT REGION 30

FIG. 6

FIRST SCORE : 3 (NUMBER OF ESTIMATION POSITIONS 24)
OR
3/S (NUMBER OF ESTIMATION POSITIONS
 24/AREA OF CANDIDATE REGION 22)

INFORMATION PROCESSING APPARATUS, CONTROL METHOD, AND NON-TRANSITORY STORAGE MEDIUM

CROSS-REFERENCE TO RELATED APPLICATIONS

The present application is a continuation application of U.S. patent application Ser. No. 17/949,376 filed on Sep. 21, 2022, which is a continuation application of U.S. patent application Ser. No. 17/048,235 filed on Oct. 16, 2020, which is issued as U.S. Pat. No. 11,610,385, which is a National Stage Entry of international application PCT/JP2018/017031 filed on Apr. 26, 2018, the disclosures of all of which are incorporated in their entirety by reference herein.

TECHNICAL FIELD

The present invention relates to object recognition.

BACKGROUND ART

A technique that detects an object from a captured image generated by a camera has been developed. For example, Patent Document 1 discloses an apparatus that detects a plurality of objects from a captured image and associates the detected objects. Specifically, in a case where an object (for example, a bag) and a plurality of persons are included in the captured image, the apparatus of Patent Document 1 associates the object and a person who is the owner thereof.

Thus, the apparatus of Patent Document 1 performs connection using a predefined connection relationship while recognizing parts of a person in order. For example, recognition and connection are performed in an order of face-→neck→body→arm. In addition, the apparatus of the Patent Document 1 performs recognition of an object defined in advance as an object frequently present around a recognized part. For example, a bag is defined as an object frequently present around an arm. For this reason, recognition of a bag is performed with recognition of an arm of a person as described above. As a result, it is understood that connection is made like "face→neck→body→arm→bag". Now, the apparatus of Patent Document 1 performs association of the connected face and bag (that is, association of the person and the bag).

Here, in Patent Document 1, for an object frequently present around a part of a person, information for roughly estimating around where the object is present with respect to the part is defined. Then, Patent Document 1 describes that an image region where an object is to be recognized may be limited using such information. For example, the apparatus of the Patent Document 1 detects an arm of a person according to the above-described flow, and then, limits an image region, in which a bag is to be recognized, using information indicating around where the bag is present with respect to the arm of the person. Then, the bag is recognized for the limited image region.

RELATED DOCUMENT

Patent Document

[Patent Document 1] Japanese Patent Application Publication No. 2010-086482

Non-Patent Document

[Non-Patent Document 1] Zhe Cao and three others, "Realtime Multi-Person 2D Pose Estimation using Part Affinity Fields", CoRR, Nov. 24, 2016

SUMMARY OF THE INVENTION

Technical Problem

In the technique of Patent Document 1, on an assumption that a part of a person is recognized, an object frequently present around the part is recognized. For this reason, in a case where any part of the person is not recognized, an object frequently present around the part is not recognized. For example, in the above-described example, in a case where the arm of the person is not recognized, the bag is not recognized.

In this respect, all parts of the person are not always included in the captured image. For example, in a case where an obstacle stands in front of the arm of the person or the arm of the person is outside an imaging range of a camera, the arm of the person is not recognized from a captured image. For this reason, the bag becomes unable to be recognized.

The invention has been accomplished in view of the above-described problem, and provides a technique that detects a belonging of a person from a captured image with high accuracy.

Solution to Problem

An information processing apparatus of the invention includes 1) a candidate region detection unit that detects, based on an image feature of a target object to be detected, one or more candidate regions, each of which is an image region estimated to represent the target object, from a captured image, 2) an estimation position detection unit that detects a person region representing a person from the captured image and detects an estimation position of the target object in the captured image based on the person region, and 3) a determination unit that determines an object region, which is an image region representing the target object, from among the one or more candidate regions based on the one or more candidate regions and the estimation position.

A control method of the invention is a control method that is executed by a computer. The control method includes 1) a candidate region detection step of detecting, based on an image feature of a target object to be detected, one or more candidate regions, each of which is an image region estimated to represent the target object, from a captured image, 2) an estimation position detection step of detecting a person region representing a person from the captured image and detecting an estimation position of the target object in the captured image based on the person region, and 3) a determination step of determining an object region, which is an image region representing the target object, from among the one or more candidate regions based on the one or more candidate regions and the estimation position.

A program of the invention causes a computer to execute each step of the control method of the invention.

Advantageous Effects of Invention

According to the invention, a technique that detects a belonging of a person from a captured image with high accuracy is provided.

BRIEF DESCRIPTION OF THE DRAWINGS

The above-described object and other objects, features, and advantages will become apparent from preferable example embodiments described below and the accompanying drawings.

DESCRIPTION OF EMBODIMENTS

Hereinafter, example embodiments of the invention will be described referring to the drawings. In all drawings, the same components are represented by the same reference numerals, and description thereof will not be repeated. In respective block diagrams, except for a case where particular description is provided, each block is not a configuration of a hardware unit but a configuration of a function unit.

Example Embodiment 1

<Outline>

Figure 1:
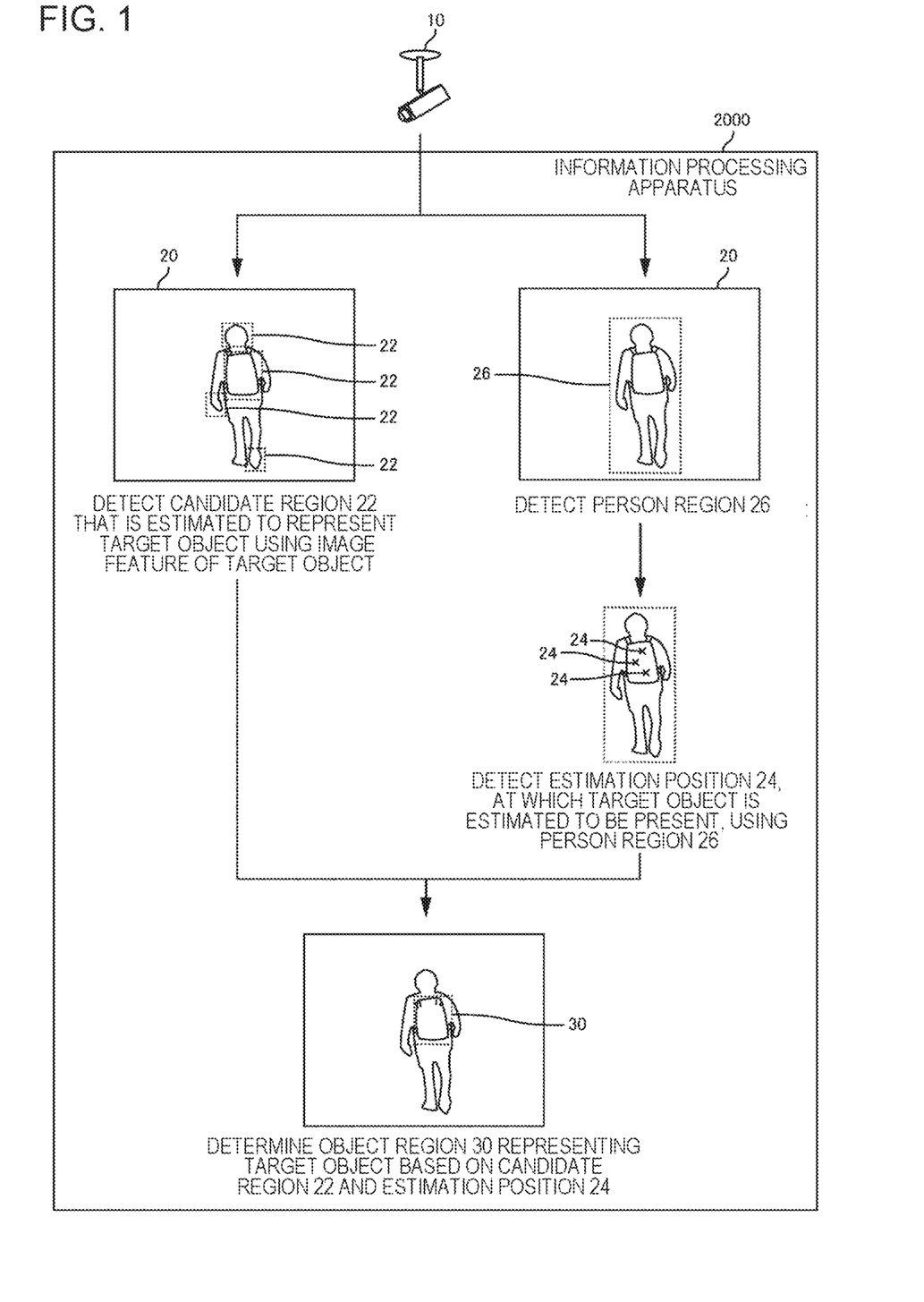
FIG. 1 is a diagram conceptually showing processing that is executed by an information processing apparatus of an example embodiment.

FIG. 1 is a diagram conceptually showing processing that is executed by an information processing apparatus 2000 of the example embodiment. The information processing apparatus 2000 detects an object region 30, which is an image region representing a target object, from a captured image 20 generated by a camera 10. The target object is a belonging of a person. Note that the term "a belonging of a person" used herein is not limited to an object (a handbag, a cane, or the like) that is held by a person with a hand, and generally includes an object that is carried with a person in any form. For example, the belonging of the person includes an object (a shoulder bag or the like) that a person hang on a shoulder, an object (an identification card or the like) hanging around a person's neck, an object (a rucksack or the like) that a person carries on a back, an object (a hat, a helmet, or the like) that a person wears on a head, an object (glasses, sunglasses, or the like) that a person wears on a face, an object (a watch or the like) that a person wears on a hand, or the like.

The information processing apparatus 2000 detects one or more candidate regions 22 from the captured image 20 based on an image feature of the target object. Each candidate region 22 is an image region that is estimated to represent the target object. For example, in a case where the target object is a hat, information processing apparatus 2000 detects an image region estimated to represent the hat based on an image feature of the hat and sets the detected image region as the candidate region 22. Each candidate region 22 is, for example, an image region presumed that a probability of representing the target object is equal to or greater than a predetermined value.

The information processing apparatus 2000 detects a person region 26 from the captured image 20 and detects an estimation position 24 based on the detected person region 26. The person region 26 is a region estimated to represent a person. The estimation position 24 is a position in the captured image 20 where the target object is estimated to be present.

Here, a relative positional relationship of a belonging of a person with respect to the person can be predicted according to the kind of the belonging. For example, a position of a hat is highly likely to be a head of a person. In addition, for example, a position of sunglasses is highly likely to be a face of a person. Moreover, for example, a position of a rucksack is highly likely to be a back of a person.

In light of the above, the information processing apparatus 2000 detects the estimation position 24 based on such a predictable relative positional relationship of the target object with respect to a person. For example, in a case where the target object is a hat, the information processing apparatus 2000 detects a position, at which the hat is estimated to be present, based on a relative positional relationship of the hat with respect to a person represented by the person region 26 and sets the detected position as the estimation position 24.

Then, the information processing apparatus 2000 determines the object region 30 based on each candidate region 22 and the estimation position 24. For example, the information processing apparatus 2000 determines the candidate region 22 including the estimation position 24 from among a plurality of detected candidate regions 22 as the object region 30. However, as described below, the object region 30 that is determined based on each candidate region 22 and the estimation position 24 is not limited to the candidate region 22 including the estimation position 24.

<Operations and Effects>

With the information processing apparatus 2000 of the example embodiment, the object region 30 representing the target object is determined using each candidate region 22 detected based on the image feature of the target object and the estimation position 24 detected based on the person region 26. In this way, all of the candidate regions 22 detected based on the image feature of the target object are not determined as the object region 30 (the image region representing the target object), but the candidate region 22 that is determined as the object region 30 is limited by the estimation position 24 detected based on the person region 26. For example, the candidate region 22 at a position where the target object is less likely to be present is not determined as the object region 30. In this way, the image region representing the target object is determined using two criterions of a criterion of the image feature of the target object and a criterion of the image region representing the person, whereby the image region representing the target object can be determined with high accuracy compared to a case where an image region is determined by one criterion of the image feature of the target object.

Here, the estimation position 24 of the target object is detected using the image region representing the person. For this reason, even though a part (for example, an arm or the like) of the person is not detected from the captured image 20, the estimation position 24 can be detected. Accordingly, with the information processing apparatus 2000, even though a part of the person is not included in the captured image 20, the object region 30 can be determined.

Note that the above description referring to FIG. 1 is for illustration for ease of understanding of the information processing apparatus 2000, and is not intended to limit the functions of the information processing apparatus 2000. Hereinafter, the information processing apparatus 2000 of the example embodiment will be described in more detail.

<Example of Functional Configuration of Information Processing Apparatus 2000>

Figure 2:
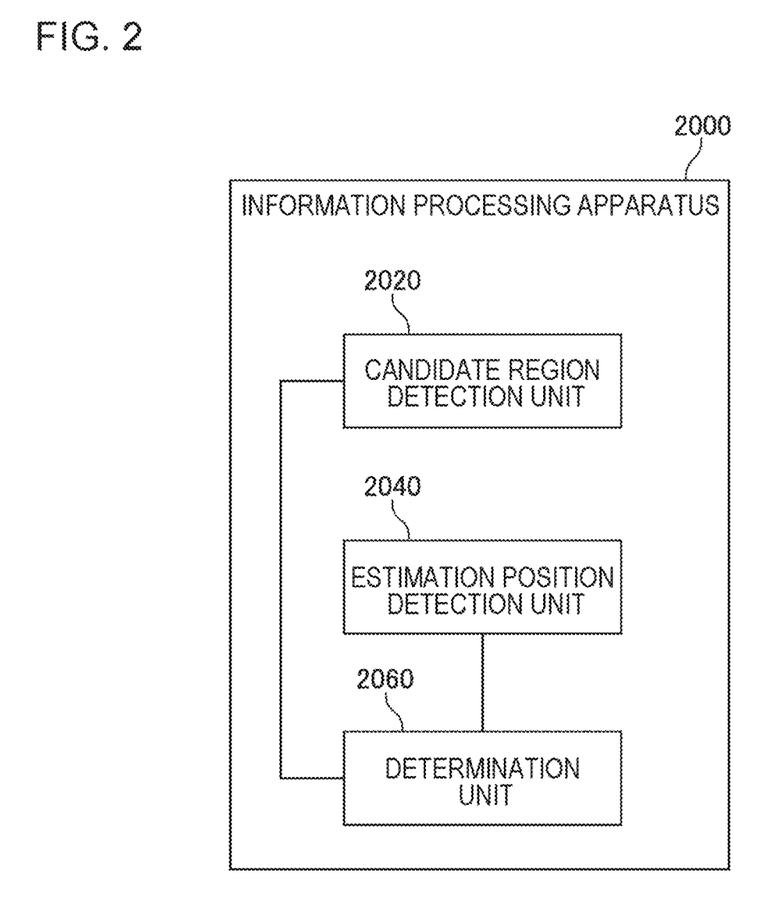
FIG. 2 is a diagram illustrating the functional configuration of an information processing apparatus of Example Embodiment 1.

FIG. 2 is a diagram illustrating the functional configuration of the information processing apparatus 2000 of Example Embodiment 1. The information processing apparatus 2000 has a candidate region detection unit 2020, an estimation position detection unit 2040, and a determination unit 2060. The candidate region detection unit 2020 detects one or more candidate regions 22 from the captured image 20 based on the image feature of the target object to be detected. The estimation position detection unit 2040 detects the person region 26 from the captured image 20. In addition, the estimation position detection unit 2040 detects the estimation position 24 based on the detected person region 26. The determination unit 2060 determines the object region 30 based on each candidate region 22 and the estimation position 24.

<Hardware Configuration of Information Processing Apparatus 2000>

Each functional component of the information processing apparatus 2000 may be implemented by hardware (for example, a hard-wired electronic circuit or the like) that implements each functional component or may be implemented by a combination of hardware and software (for example, a combination of an electronic circuit and a program that controls the electronic circuit, or the like). Hereinafter, a case where each functional component of the information processing apparatus 2000 is implemented by a combination of hardware and software will be further described.

Figure 3:
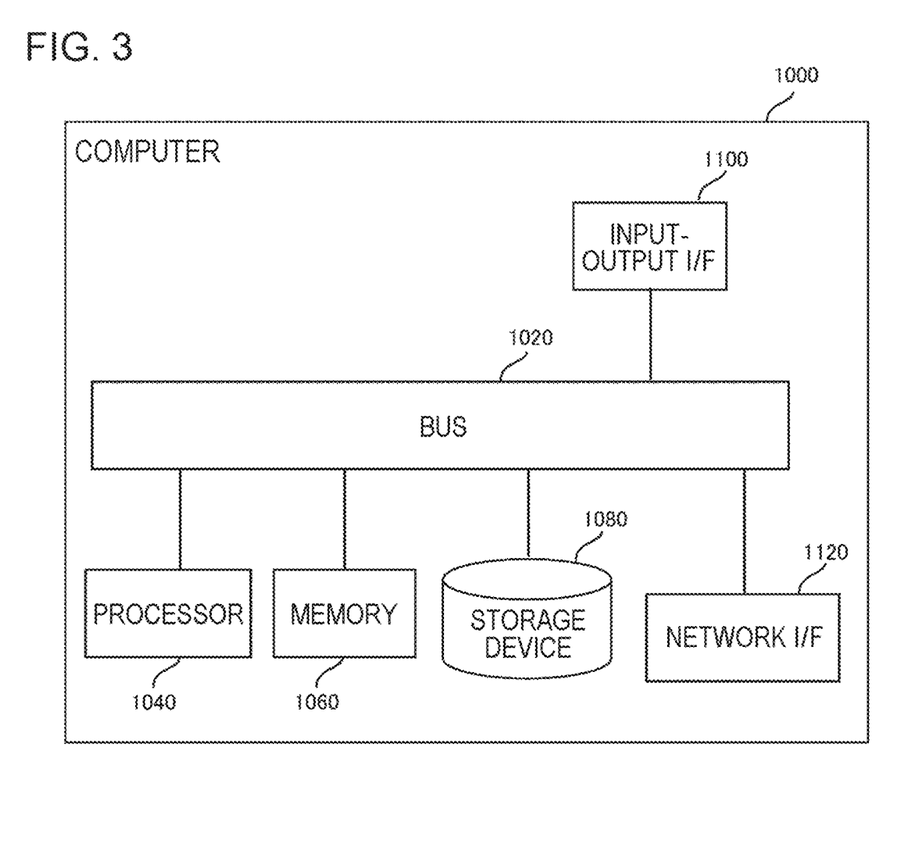
FIG. 3 is a diagram illustrating a computer for implementing the information processing apparatus.

FIG. 3 is a diagram illustrating a computer 1000 for implementing the information processing apparatus 2000. The computer 1000 is any computer. For example, the computer 1000 is a stationary computer, such as a personal computer (PC) or a server machine. In addition, for example, the computer 1000 is a portable computer, such as a smartphone or a tablet terminal. Moreover, for example, the computer 1000 may be the camera 10 that generates the captured image 20. The computer 1000 may be a dedicated computer designed in order to implement the information processing apparatus 2000 or may be a general-purpose computer.

The computer 1000 has a bus 1020, a processor 1040, a memory 1060, a storage device 1080, an input-output interface 1100, and a network interface 1120. The bus 1020 is a data transmission path through which the processor 1040, the memory 1060, the storage device 1080, the input-output interface 1100, and the network interface 1120 transmit and receive data from one another. However, a method of connecting the processor 1040 and the like to one another is not limited to bus connection.

A processor 1040 is various processors, such as a central processing unit (CPU), a graphics processing unit (GPU), and a field-programmable gate array (FPGA). A memory 1060 is a main storage apparatus that is implemented using a random access memory (RAM) or the like. A storage device 1080 is an auxiliary storage apparatus that is implemented using a hard disk, a solid state drive (SSD), a memory card, or a read only memory (ROM).

The input-output interface 1100 is an interface that connects the computer 1000 and an input-output device. For example, an input apparatus, such as a keyboard, or an output apparatus, such as a display apparatus, is connected to the input-output interface 1100. The network interface 1120 is an interface that connects the computer 1000 to a communication network. The communication network is, for example, a local area network (LAN) or a wide area network (WAN). A method in which the network interface 1120 is connected to the communication network may be wireless connection or may be wired connection.

The storage device 1080 stores a program module that implements each functional component of the information processing apparatus 2000. The processor 1040 reads each program module to the memory 1060 and executes each program module, thereby implementing a function corresponding to each program module.

<Camera 10>

The camera 10 is any imaging apparatus that performs imaging and generates image data as a result of imaging. For example, the camera 10 is a surveillance camera that is provided at a surveillance location.

As described above, the computer 1000 that implements the information processing apparatus 2000 may be the camera 10. In this case, the camera 10 analyzes the captured image 20 generated by the camera 10, thereby determining the object region 30. As the camera 10 having such a function, for example, a camera, called an intelligent camera, a network camera, or an Internet protocol (IP) camera, can be used.

<Use Example of Information Processing Apparatus 2000>

The information processing apparatus 2000 can be used in any scene where processing of "detecting a predetermined object from image data generated by the camera" is useful. For example, the information processing apparatus 2000 is used for analysis of surveillance video generated by a surveillance camera. In this case, the camera 10 is a surveillance camera that generates surveillance video. The captured image 20 is a video frame constituting the surveillance video.

The information processing apparatus 2000 determines an image region representing a predetermined object (that is, an object region 30 representing the target object) from the video frame constituting the surveillance video. In this way, the presence of the target object at the surveillance location can be recognized. Furthermore, the person that carries the target object can also be detected.

More specifically, with the information processing apparatus 2000, the presence of a dangerous object can be recognized using the surveillance video or the presence of a suspicious person (a person who carries a dangerous object or a person who hides a face behind sunglasses, a helmet, or the like) can be recognized using the surveillance video. Furthermore, in a case where a left-behind object is found at a facility under surveillance, past surveillance video generated by surveillance cameras provided at various locations of the facility is analyzed by the information processing apparatus 2000, whereby determination of a route along which the left-behind object is carried, detection of a person who carries the left-behind object, or the like can also be performed.

<Flow of Processing>

Figure 4:
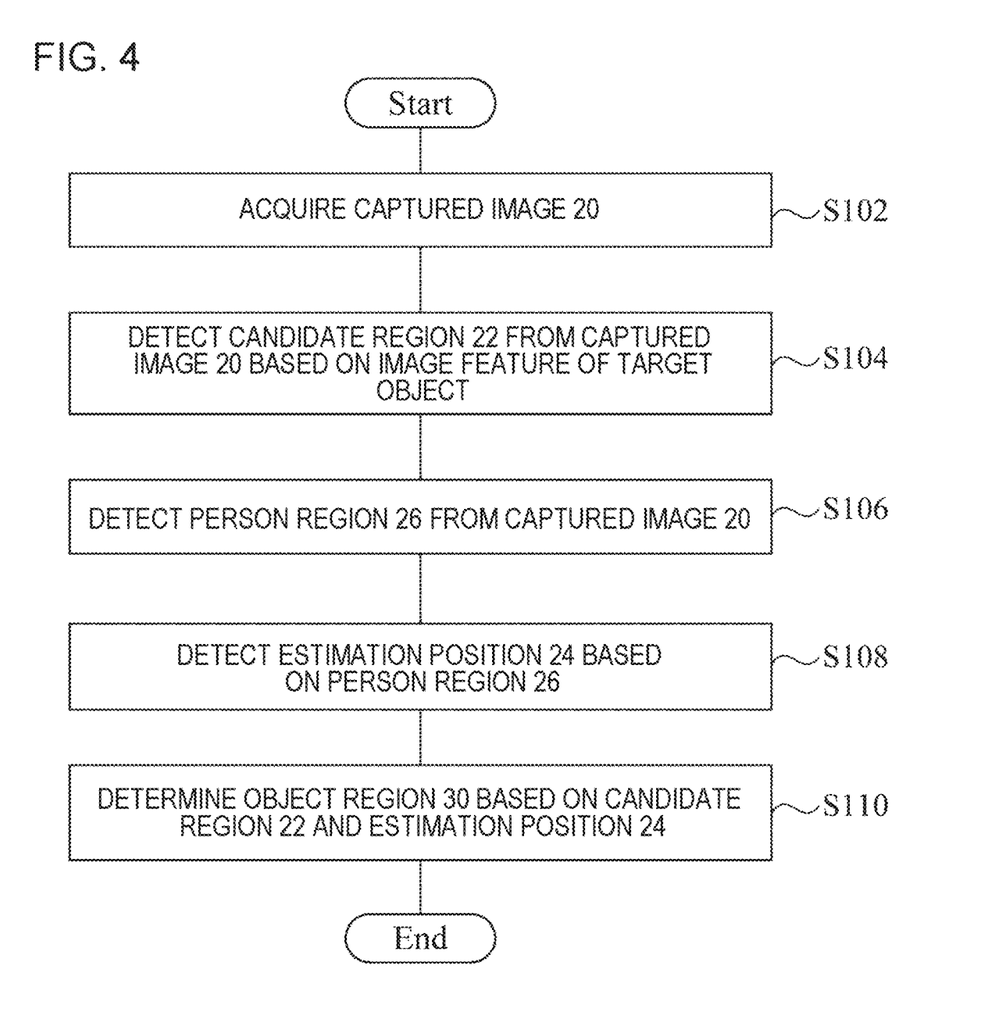
FIG. 4 is a flowchart illustrating a flow of processing that is executed by the information processing apparatus of Example Embodiment 1.

FIG. 4 is a flowchart illustrating a flow of processing that is executed by the information processing apparatus 2000 of Example Embodiment 1. The information processing apparatus 2000 acquires the captured image 20 (S102). The candidate region detection unit 2020 detects one or more candidate regions 22 from the captured image 20 based on the image feature of the target object (S104). The estimation position detection unit 2040 detects the person region 26 from the captured image 20 (S106). The estimation position detection unit 2040 detects the estimation position 24 based on the detected person region 26 (S108). The determination unit 2060 determines the object region 30 based on each candidate region 22 and the estimation position 24 (S110).

Note that all kinds of processing do not always need to be executed sequentially as shown in FIG. 4. For example, the processing (S104) that is executed by the candidate region detection unit 2020 and the processing (S106 and S108) that is executed by the estimation position detection unit 2040 may be executed in parallel.

A timing at which the information processing apparatus 2000 executes a series of processing shown in FIG. 4 varies. For example, the information processing apparatus 2000 acquires the captured image 20 and executes a series of processing shown in FIG. 4 each time the captured image 20 is generated by the camera 10. In addition, for example, the information processing apparatus 2000 collectively acquires a plurality of captured images 20 generated by the camera 10 at a predetermined timing and executes a series of processing shown in FIG. 4 on each captured image 20 (so-called, batch processing). Moreover, for example, the information processing apparatus 2000 receives an input operation to specify the captured image 20 and executes a series of processing on the specified captured image 20.

<Acquisition of Captured Image 20: S102>

The information processing apparatus 2000 acquires the captured image 20 (S102). The captured image 20 may be image data itself generated by the camera 10 or may be image data obtained by executing any processing (for example, tone correction, trimming, or the like) on image data generated by the camera 10.

As a method in which the information processing apparatus 2000 acquires the captured image 20, any method can be used. For example, the information processing apparatus 2000 accesses a storage apparatus, in which the captured image 20 is stored, to acquire the captured image 20. The storage apparatus, in which the captured image 20 is stored, may be provided in the camera 10 or may be provided outside the camera. In addition, for example, the information processing apparatus 2000 may receive the captured image 20 transmitted from the camera 10 to acquire the captured image 20. Note that, as described above, in a case where the information processing apparatus 2000 is implemented as the camera 10, the information processing apparatus 2000 acquires the captured image 20 generated by the information processing apparatus 2000.

<Detection of Candidate Region 22: S104>

The candidate region detection unit 2020 detects each candidate region 22 from the captured image 20 based on the image feature of the target object (S104). Here, as a technique that detects, based on an image feature of an object to be detected, an image region (that is, each candidate region 22) presumed to represent the object from image data, an existing technique can be used. For example, in detecting each candidate region 22, a detector that is learned in advance so as to detect the image region estimated to represent the target object from image data can be used. As a model of the detector, any mode, such as a neural network (for example, a convolutional neural network) or a support vector machine (SVM), can be employed.

Here, the candidate region detection unit 2020 detects an image region for which a probability of being presumed to represent the target object is equal to or greater than a threshold value as the candidate region 22. Here, in a case where the threshold value is made large, false negative (detection leakage) easily occurs. On the other hand, in a case where the threshold value is made small, false positive (erroneous detection) easily occurs.

In this respect, in the information processing apparatus 2000, the object region 30 is not determined only by the candidate region detection unit 2020, but the object region 30 is determined using the estimation position 24 detected by the estimation position detection unit 2040. For this reason, it can be said that it is preferable that the threshold value is set to be small and erroneous detection occurs compared to that the threshold value is set to be large and detection leakage occurs. This is because the object region 30 representing the target object can be determined with high accuracy by a method of setting the threshold value to be small to detect many candidate regions 22 and narrowing down the candidate regions 22 using the estimation position 24 detected by the estimation position detection unit 2040.

Now, the threshold value that is used by the candidate region detection unit 2020 is suitably set to a value equal to or less than a threshold value set in a case where the object region 30 is determined based on only the image feature of the target object (that is, in a case where the estimation position detection unit 2040 is not used).

The candidate region detection unit 2020 generates data representing a detection result of each candidate region 22. Such data is data for specifying the detected candidate region 22, and indicates, for example, a specified position (for example, coordinates of an upper left end) and a size (for example, a width and a height) of the candidate region 22.

<Detection of Person Region 26: S106>

The estimation position detection unit 2040 detects the person region 26 from the captured image 20 (S106). Here, as a technique that detects an image region representing a person from image data, an existing technique can be used. For example, a detector that is learned in advance so as to detect the image region representing the person from image data can be used. As a model of the detector, any model, such as a neural network, can be used.

Here, in order to detect the estimation position 24, it is suitable to detect a part (head, face, body, hand, leg, or the like) of the body of the person from the person region 26. A part of the body of the person can be detected by detection using the above-described detector or the like or detection using a template image, a local feature value, or the like.

In addition, for example, the estimation position detection unit 2040 may detect a set of feature points of the person, such as a position of a joint of the person, as the person region 26. As a technique that detects a position of a feature point of the person, such as a joint, for example, the technique described in Non-Patent Document 1 can be used.

<Detection of Estimation Position 24: S106>

The estimation position detection unit 2040 detects the estimation position 24 based on the person region 26. As described above, the estimation position 24 is a position in the captured image 20 where the target object is estimated to be present. The estimation position 24 may be represented by one point on the captured image 20 or may be represented by an image region.

For example, in detecting the estimation position 24, a detector that is learned in advance so as to detect a position in image data, at which the target object is estimated to be present, in response to the input of image data with a specified position of an image region representing a person. As a model of the detector, any model, such as a neural network, can be employed.

Learning of the detector is performed, for example, using training data composed of a composition of "image data, a person region in image data, and a position of the target object in image data". With the use of such training data, it is possible to cause the detector to learn a relative positional relationship of the target object with respect to the person. In addition, it is suitable that the training data includes information indicating a position of each part of the person in the person region.

The estimation position detection unit 2040 detects a position, at which a probability of the presence of the target object is equal to or greater than a predetermined value, as the estimation position 24. In this case, the estimation position detection unit 2040 may output a probability of the presence of the target object at the estimation position 24 along with the estimation position 24.

For example, the estimation position detection unit 2040 generates matrix data having the same size as the captured image 20 as data indicating a detection result of the estimation position 24. For example, the matrix data shows 1 at the position of the estimation position 24 and shows 0 at other positions. In a case of outputting the probability of the presence of the target object at the estimation position 24, the matrix data indicates a probability that the target object is present at each position. However, data representing the detection result of the estimation position 24 may be in any format and is not limited to the matrix data.

<<Limitation of Detection Range>>

The estimation position detection unit 2040 may limit an image region, in which the detection of the estimation position 24 is performed, using each candidate region 22. That is, the estimation position 24 is detected from a partial image region limited based on each candidate region 22 instead of the entire captured image 20. In this way, it is possible to reduce a time or computer resources needed for detecting the estimation position 24.

For example, the estimation position detection unit 2040 sets only the inside of each candidate region 22 as a detection range of the estimation position 24. In addition, for example, the estimation position detection unit 2040 detects the estimation position 24 from a predetermined range including each candidate region 22. For example, the predetermined range is a range that is obtained by enlarging each candidate region 22 with a predetermined magnification greater than one.

Note that the estimation position detection unit 2040 may limit the image region, in which the person region 26 is to be detected, using each candidate region 22. For example, the estimation position detection unit 2040 detects the person region 26 from the predetermined range including each candidate region 22 (for example, the range obtained by enlarging each candidate region 22).

<Determination of Object Region 30>

The determination unit 2060 determines the object region 30 based on each candidate region 22 and the estimation position 24. Conceptually, the determination unit 2060 determines the candidate region 22, which is particularly highly likely to include the target object, among the candidate regions 22, each of which is the image region presumed to include the target object, using the estimation position 24 and determines the determined candidate region 22 as the object region 30. However, as described below, the object region 30 does not need to completely coincide with any one candidate region 22, and may be a partial image region of the candidate region 22.

The determination unit 2060 determines the object region 30 in view of an overlap of each candidate region 22 and the estimation position 24. As a specific method of the determination, various methods can be employed. Hereinafter, the specific method will be illustrated.

<<Specific Method 1>>

Figure 5:
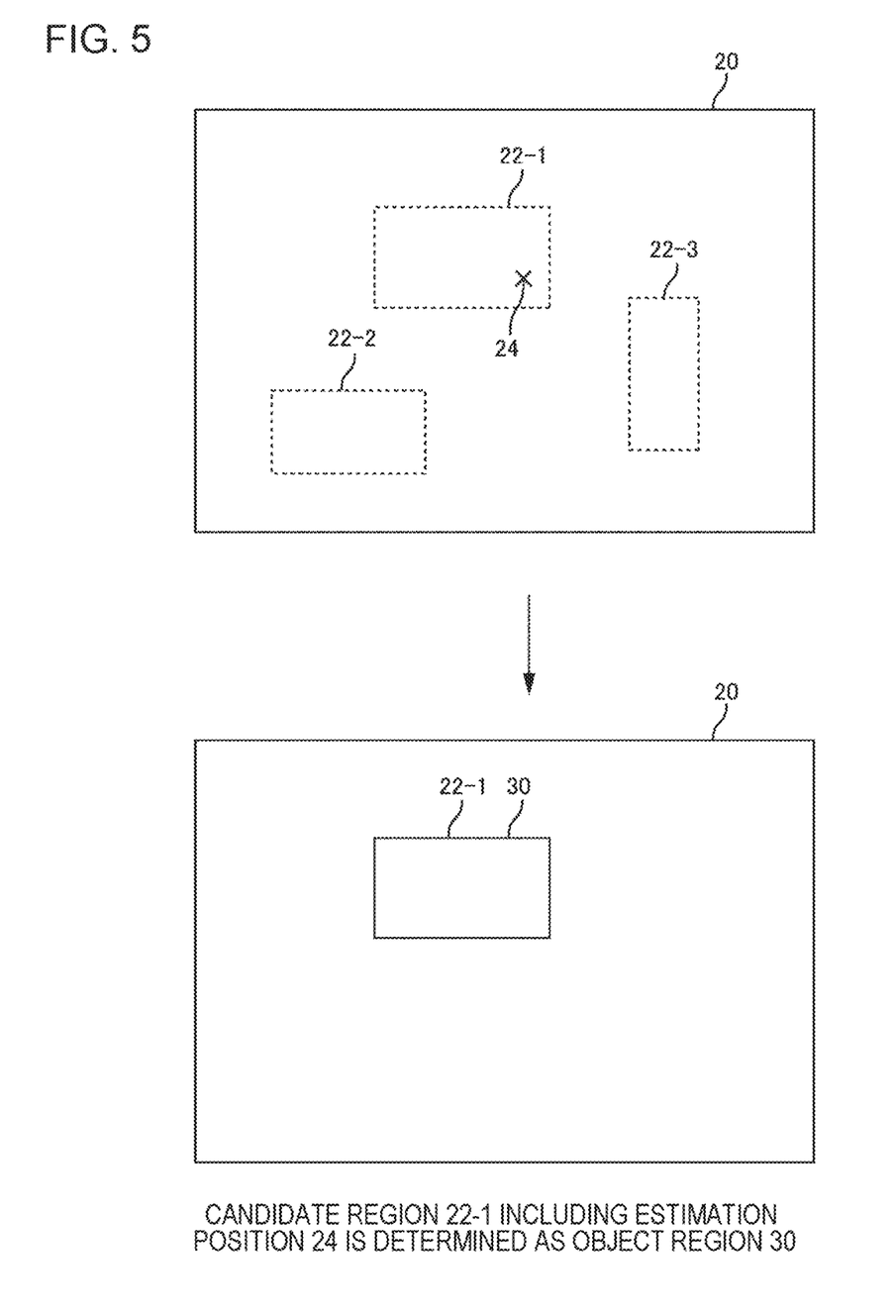
FIG. 5 is a diagram illustrating a candidate region including an estimation position.

The determination unit 2060 determines the candidate region 22 including the estimation position 24 as the object region 30. FIG. 5 is a diagram illustrating the candidate region 22 including the estimation position 24. In FIG. 5, a plurality of candidate regions 22 are detected from the captured image 20. Furthermore, one estimation position 24 is detected. Here, the estimation position 24 is included in a candidate region 22-1. Now, the determination unit 2060 determines the candidate region 22-1 as the object region 30.

<<Specific Method 2>>

Here, it is assumed that a plurality of estimation positions 24 are computed. Then, for each candidate region 22, the determination unit 2060 computes a score (hereinafter, referred to as a first score) representing a degree to which the candidate region 22 includes the estimation position 24. The determination unit 2060 determines the object region 30 based on the first score.

There are various methods of determining the object region 30 based on the first score. For example, the determination unit 2060 determines the candidate region 22 for which the first score is the greatest as the object region 30. In addition, for example, the determination unit 2060 determines the candidate region 22 for which the first score is equal to or greater than a predetermined value as the object region 30. In the latter case, a plurality of object regions 30 can be determined.

There are various ways of defining the first score. For example, the determination unit 2060 computes the number of estimation positions 24 included in each candidate region 22 as the first score for the candidate region 22. In addition, for example, the determination unit 2060 computes a value obtained by normalizing the number of estimation position 24 included in each candidate region 22 by the size of the candidate region 22 (for example, a value obtained by dividing the number of estimation positions 24 by the area of the candidate region 22) as the first score for the candidate region 22.

Figure 6:
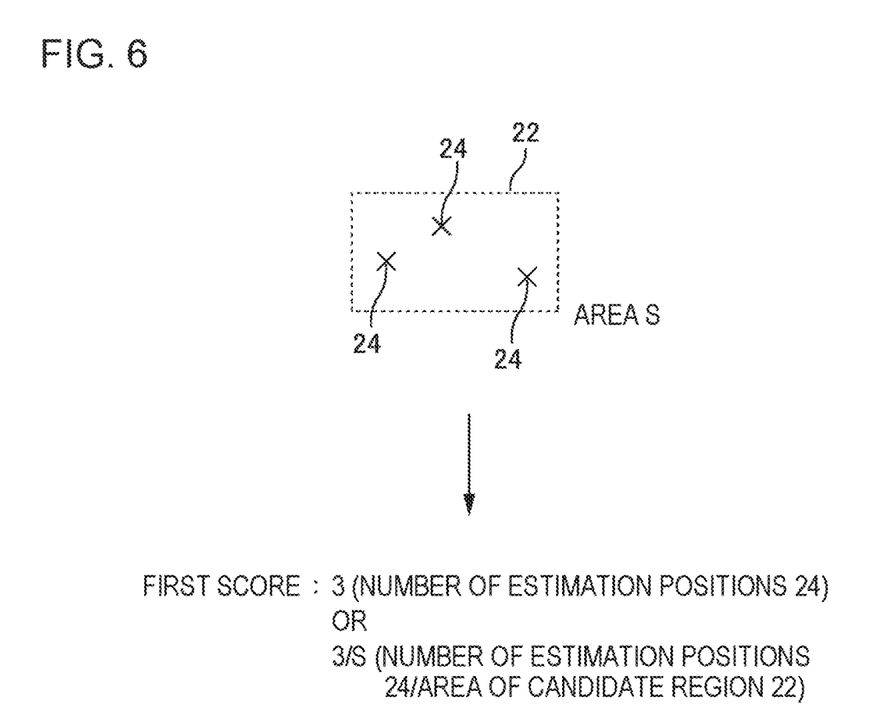
FIG. 6 is a diagram illustrating a first score that is computed based on the number of estimation positions included in a candidate region.

FIG. 6 is a diagram illustrating a first score that is computed based on the number of estimation positions 24 included in the candidate region 22. Three estimation positions 24 are included in the candidate region 22. Now, for example, the determination unit 2060 sets the first score of the candidate region 22 to three. Here, it is assumed that the area of the candidate region 22 is S. In this case, the determination unit 2060 may set 3/S, obtained by normalizing the first score of the candidate region 22 by the area of the candidate region 22 as the first score.

A computation method of the first score is not limited to the above-described example. For example, it is assumed that a probability of the presence of the target object is computed for each estimation position 24. In this case, the determination unit 2060 may compute the total of the presence probabilities computed for the respective estimation positions 24 included in the candidate region 22 as the first score for the candidate region 22.

Figure 7:
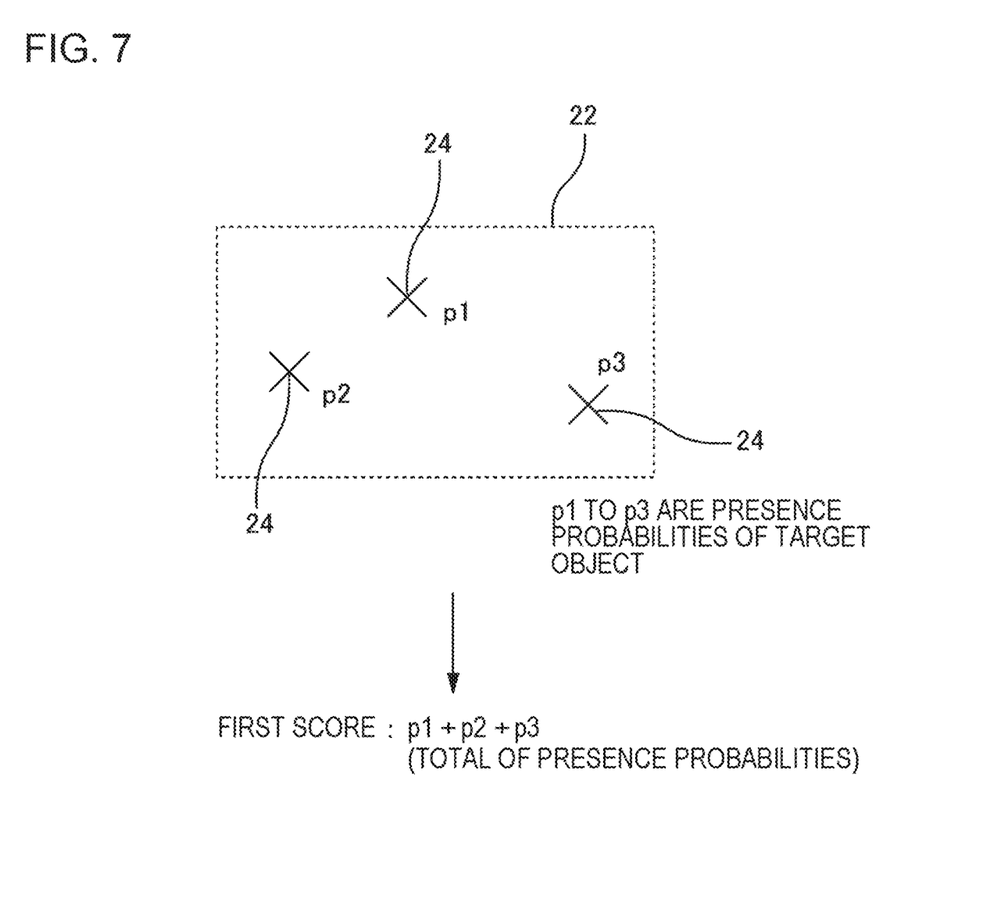
FIG. 7 is a diagram illustrating a first score that is computed in consideration of a presence probability of a target object computed for an estimation position.

FIG. 7 is a diagram illustrating a first score that is computed in consideration of a presence probability of the target object computed for the estimation position 24. Three estimation positions 24 are included in the candidate region 22, and the presence probabilities computed for the respective estimation positions 24 are p1, p2, and p3. For this reason, the first score of the candidate region 22 is p1+p2+p3.

In this way, the first score is computed in consideration of the probability that the target object is present at the estimation position 24, whereby the object region 30 representing the target object can be determined with higher accuracy. For example, it can be said that the candidate region 22 including one estimation position 24 where the presence probability of the target object is 0.6 is highly likely to be the image region representing the target object rather than the candidate region 22 including three estimation positions 24 in each of which the presence probability of the target object is 0.1. With the computation method in which the total of the presence probabilities is set as the first score, the first score of the former candidate region 22 becomes greater than the first score of the latter candidate region 22. For this reason, the former candidate region 22 is easily determined as the object region 30.

<<Specific Method 3>>

Here, it is assumed that, for each candidate region 22, the candidate region detection unit 2020 computes a probability that the candidate region 22 represents the target object. Furthermore, it is assumed that the determination unit 2060 computes the above-described first score for each candidate region 22. The determination unit 2060 computes a second score as a product of the probability that the candidate region 22 represents the target object and the first score. Then, the determination unit 2060 determines the object region 30 based on the second score.

There are various methods of determining the object region 30 based on the second score. For example, the determination unit 2060 determines the candidate region 22 for which the second score is the greatest as the object region 30. In addition, for example, the determination unit 2060 determines the candidate region 22 for which the second score is equal to or greater than a predetermined value as the object region 30.

<<Specific Method 4>>

The determination unit 2060 computes a third score based on a distance between a representative point of each candidate region 22 and the estimation position 24 and determines the object region 30 based on the computed third score. There are various methods of determining the object region 30 based on the third score. For example, the determination unit 2060 determines the candidate region 22 for which the smallest third score is computed as the object region 30. In addition, for example, the determination unit 2060 determines the candidate region 22 for which the third score equal to or less than a predetermined value is computed as the object region 30.

The representative point of the candidate region 22 can be any point included in the candidate region 22. For example, the representative point of the candidate region 22 is the center of the candidate region 22.

In a case where there are a plurality of estimation positions 24, the determination unit 2060 may compute a distance between each of a plurality of estimation positions 24 and the representative point of the candidate region 22 or may compute a distance between any one estimation position 24 and the representative point of the candidate region 22. In the former case, for example, the determination unit 2060 computes the third score based on a statistic (a minimum value, a mode, an average value, or the like) of a plurality of computed distances. In the latter case, the determination unit 2060 computes a distance between one estimation position 24 and the representative point of the candidate region 22 and computes the third score based on the distance.

Here, in a case of computing a distance between only one estimation position 24 and the representative point of the candidate region 22, there are various methods of determining the estimation position 24. For example, the determination unit 2060 computes the center of an image region composed of a plurality of estimation positions 24, determines the estimation position 24 closest to the center, and computes a distance between the determined estimation position 24 and the representative point of the candidate region 22. In addition, for example, in a case where the presence probability of the target object is computed for each estimation position 24, the determination unit 2060 computes a distance between the estimation position 24 for which the presence probability of the target object is the highest, and the representative point of the candidate region 22.

In a case where the estimation position 24 is represented as an image region, the determination unit 2060 computes the third score based on a distance between a representative point of the image region and the representative point of the candidate region 22. The representative point of the estimation position 24 represented as the image region is, for example, the center position of the image region.

There are various methods of computing the third score based on the distance between the estimation position 24 and the representative point of the candidate region 22. For example, the determination unit 2060 sets the distance between the representative point of the candidate region 22 and the estimation position 24 itself as the third score.

In addition, for example, the determination unit 2060 sets a value obtained by multiplying the distance between the representative point of the candidate region 22 and the estimation position 24 by a correction coefficient based on a probability of the presence of the target object at the estimation position 24 as the third score. The correction coefficient becomes smaller as the probability of the presence of the target object at the estimation position 24 is higher. For example, the correction coefficient is a reciprocal of the probability of the target object being present at the estimation position 24.

In this way, the probability of the presence of the target object at the estimation position 24 is taken into consideration, whereby the object region 30 representing the target object can be determined with higher accuracy. For example, it is considered that the candidate region 22 having the distance of 2 from the estimation position 24 for which the probability of the presence of the target object is 0.6 is highly likely to be the image region representing a target object rather than the candidate region 22 having the distance of 1 from the estimation position 24 for which the probability of the presence of the target object is 0.1. With the method using the correction coefficient described above, the former candidate region 22 has the third score greater than the latter candidate region 22. Accordingly, the former candidate region 22 is easily determined as the object region 30.

<Output of Result>

The information processing apparatus 2000 outputs information (hereinafter, referred to as output information) regarding the determination of the object region 30. There are various methods of outputting the output information. For example, the information processing apparatus 2000 stores the output information in any storage apparatus. In addition, for example, the information processing apparatus 2000 stores the output information in a display apparatus.

For example, the output information indicates an identifier of the captured image 20, a specified position (for example, coordinates of an upper left end of the object region 30) and the size (for example, a width and a height) of the object region 30. In a case where the object region 30 is determined from the captured image 20, the output information indicates the position and the size for each of a plurality of object regions 30. In addition, for example, the output information may be the captured image 20 on which information (for example, a frame) indicating the object region 30 is superimposed.

Example Embodiment 2

Figure 8:
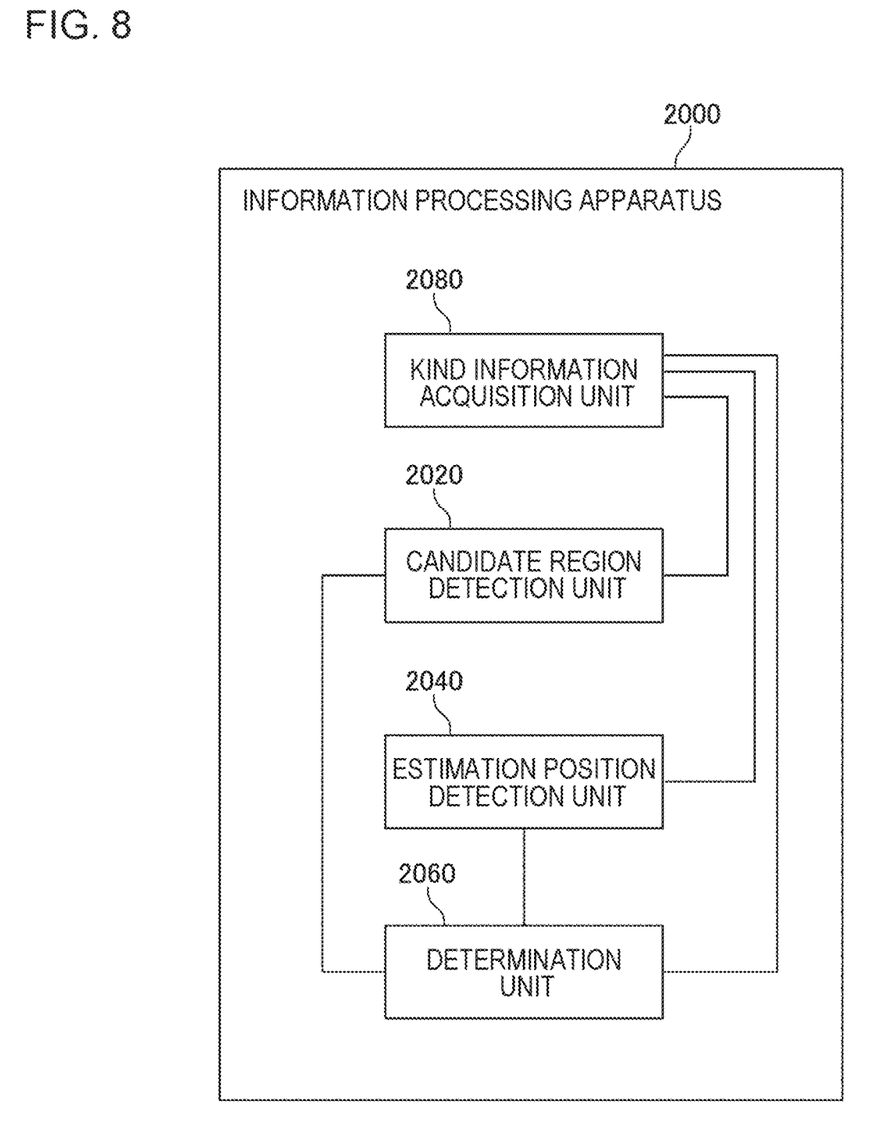
FIG. 8 is a block diagram illustrating the functional configuration of an information processing apparatus of Example Embodiment 2.

FIG. 8 is a block diagram illustrating the functional configuration of an information processing apparatus 2000 of Example Embodiment 2. The information processing apparatus 2000 of Example Embodiment 2 has the same functions as the information processing apparatus 2000 of Example Embodiment 1 except for the following points.

The information processing apparatus 2000 of Example Embodiment 2 handles a plurality of kinds of target objects. Specifically, the information processing apparatus 2000 acquires kind information indicating the kind of an object to be detected and sets the object of the kind indicated in the kind information as the target object. Thus, the information processing apparatus 2000 of Example Embodiment 2 has a kind information acquisition unit 2080 that acquires the kind information.

The number of kinds of objects indicated in the kind information may be one or may be plural. In a case where the kind information indicates a plurality of kinds of objects, the information processing apparatus 2000 sets an object of each kind as the target object and determines the object region 30 for each target object. For example, in a case where the kind information indicates three kinds of "hat, sunglasses, and white cane", the information processing apparatus 2000 determines the object region 30 representing a hat, the object region 30 representing sunglasses, and the object region 30 representing a white cane from the captured image 20.

There are various methods in which the kind information acquisition unit 2080 acquires the kind information. For example, the kind information acquisition unit 2080 acquires the kind information from a storage apparatus in which the kind information is stored. In addition, for example, the kind information acquisition unit 2080 receives kind information transmitted from another apparatus to acquire the kind information. Moreover, for example, the kind information acquisition unit 2080 receives an input of kind information from a user to acquire the kind information.

The candidate region detection unit 2020 of Example Embodiment 2 detects the candidate region 22 for an object of a kind indicated in the kind information. Here, as a technique that detects an object of a specific kind from image data, an existing technique can be used. For example, a detector that is learned so as to detect, for each kind of object, an object of the kind from image data is prepared. The candidate region detection unit 2020 inputs the captured image 20 to the detector, which is learned so as to detect the candidate region 22 for the object of the kind indicated in the kind information, to detect the candidate region 22 for the object of the kind.

The estimation position detection unit 2040 of Example Embodiment 2 detects the estimation position 24 based on the person region 26 for the object of the kind indicated in the kind information. For example, even in the estimation position detection unit 2040, a detector that detects the estimation position 24 for each kind of object is prepared. That is, a positional relationship between an object and a person is learned for each kind of object. The estimation position detection unit 2040 inputs the captured image 20 and information for determining the person region 26 to the detector, which is learned so as to detect the estimation position 24 for the object of the kind indicated by the kind information, to detect the estimation position 24 for the object of the kind.

The determination unit 2060 of Example Embodiment 2 determines the object region 30 based on the candidate region 22 and the estimation position 24 detected for the target object of the kind indicated by the kind information as described above. The output information is generated for each kind of object.

<Advantageous and Effects>

With the information processing apparatus 2000 of the example embodiment, the object region 30 is determined for the object of the kind indicated by the kind information. In this way, the information processing apparatus 2000 can be set so as to detect the specified object among a plurality of kinds of objects from the captured image 20. For this reason, each of a plurality of kinds of objects can be detected from the captured image 20 or the kind of an object to be detected can be changed at each occasion. For this reason, the convenience of the information processing apparatus 2000 is improved.

For example, in response to the obtainment of information relating to a belonging of a suspicious person, the captured image 20 can be set so as to detect the belonging of the suspicious person. In a case where a left-behind object is found, the information processing apparatus 2000 can be set so as to detect the left-behind object.

<Example of Hardware Configuration>

The hardware configuration of a computer that implements the information processing apparatus 2000 of Example Embodiment 2 is represented by, for example, FIG. 3 as in Example Embodiment 1. However, a program module that implements the functions of the information processing apparatus 2000 of the example embodiment is stored in a storage device 1080 of a computer 1000 that implements the information processing apparatus 2000 of the example embodiment.

<Flow of Processing>

Figure 9:
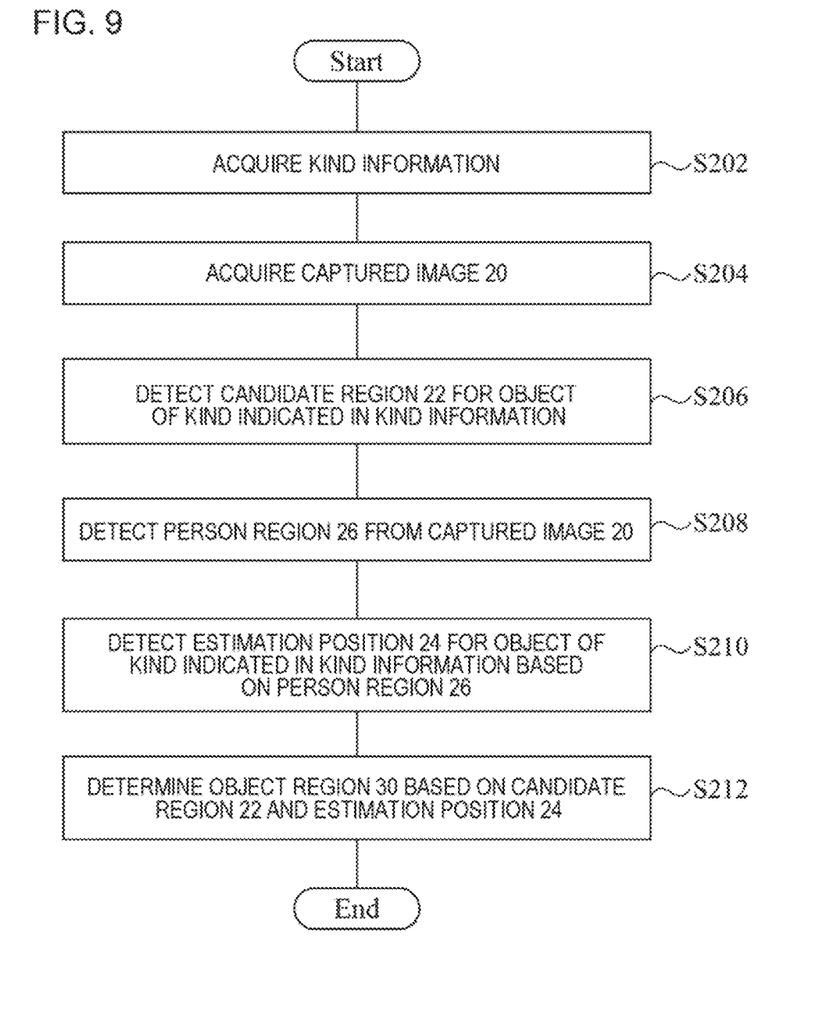
FIG. 9 is a flowchart illustrating a flow of processing that is executed by the information processing apparatus of Example Embodiment 2.

FIG. 9 is a flowchart illustrating a flow of processing that is executed by the information processing apparatus 2000 of Example Embodiment 2. The kind information acquisition unit 2080 acquires the kind information (S202). The information processing apparatus 2000 acquires the captured image 20 (S204). The candidate region detection unit 2020 detects the candidate region 22 for the object of the kind indicated in the kind information (S206). The estimation position detection unit 2040 detects the person region 26 (S208). The estimation position detection unit 2040 detects the estimation position 24 based on the person region 26 for the object of the kind indicated in the kind information (S210). The determination unit 2060 determines the object region 30 based on the detected candidate region 22 and estimation position 24.

Although the example embodiments of the invention have been described above referring to the drawings, the example embodiments are merely examples of the invention. The invention can employ various configurations other than the above.

What is claimed is:

1. An information processing apparatus comprising:
   at least one memory storing instructions; and
   at least one processor configured to execute the instructions to:
   detect one or more persons in a captured image;
   detect one or more body parts of the one or more detected persons in the captured image; and
   detect one or more belongings of the one or more detected persons in the captured image, based on one or more image features of the belongings;
   determine, based on information related to the one or more detected belongings and the one or more body parts, an image region where the belonging exists among the one or more body parts if the detected one or more of the belongings is on a corresponding body part among the body parts of the person.

2. The information processing apparatus according to claim 1, wherein the detecting the one or more belongings in the captured image includes detecting the one or more belongings using a detector being learned images which represent the one or more belongings.

3. The information processing apparatus according to claim 2, wherein the detector contains a learning model which has learned training data composed of one or more image data.

4. The information processing apparatus according to claim 3, wherein the learning model employs a neural network.

5. The information processing apparatus according to claim 4, wherein the neural network is a convolutional neural network.

6. The information processing apparatus according to claim 3, wherein the learning model employs a support vector machine.

7. The information processing apparatus according to claim 1, wherein the at least one processor is further configured to execute the one or more instructions to:
   detect, based on the image feature of the one or more belongings of a person, one or more first regions, each of which includes the one or more belongings in the captured image; and
   determine, based on the one or more first regions and the one or more body parts, the image region where the belonging exists among the one or more body parts.

8. The information processing apparatus according to claim 1, wherein the at least one processor configured to execute the instructions to:
   determine, based on the one or more detected belongings and the one or more body parts, a probability that the one or more belongings is on the one or more body parts.

9. The information processing apparatus according to claim 8, wherein the probability is indicated by a numerical value.

10. The information processing apparatus according to claim 8, wherein the determining, based on the information related to the one or more detected belongings and the one or more body parts, the image region comprises determining the image region based on the probability.

11. An information processing method comprising:
    detecting one or more persons in a captured image;
    detecting one or more body parts of the person one or more detected persons in the captured image; and
    detect one or more belongings of the one or more detected persons in the captured image, based on one or more image features of the belongings;
    determining, based on information related to the one or more detected belonging and the one or more body parts, an image region where the belonging exists among the one or more body parts if the detected one or more belongings is on a corresponding body part among the body parts of the person.

12. The information processing method according to claim 11, wherein the detecting the one or more belongings in the captured image includes detecting the one or more belongings using a detector being learned images which represent the one or more belongings.

13. The information processing method according to claim 12, wherein the detector contains a learning model which has learned training data composed of one or more image data.

14. The information processing method according to claim 13, wherein the learning model employs a neural network.

15. The information processing method according to claim 14, wherein the neural network is a convolutional neural network.

16. The information processing method according to claim 13, wherein the learning model employs a support vector machine.

17. The information processing method according to claim 11,
    further comprising detecting, based on the image feature of the one or more belongings of a person, one or more first regions, each of which includes the one or more belongings in the captured image; and
    wherein determining, based on the one or more first regions and the one or more body parts, the image region where the belonging exists among the one or more body parts.

18. The information processing method according to claim 11, further comprising:
    determining, based on the one or more detected belongings and the one or more body parts, a probability that the one or more belongings is on the one or more body parts.

19. The information processing apparatus method to claim 18, wherein the probability is indicated by a numerical value.

20. The information processing method according to claim 18, wherein the determining, based on the information related to the one or more detected belongings and the one or more body parts, the image region comprises determining the image region based on the probability.

21. A non-transitory computer-readable recording medium having recorded thereon instructions executable by a processor to perform:
    detecting one or more persons in a captured image;
    detecting one or more body parts of the person one or more detected persons in the captured image; and
    detect one or more belongings of the one or more persons detected in the captured image, based on one or more image features of the belongings;
    determining, based on information related to the one or more detected belonging and the one or more body parts, an image region where the belonging exists among the one or more body parts if the detected one or more belongings is on a corresponding body part among the body parts of the person.

22. The non-transitory computer-readable medium according to claim 21,
wherein the detecting the one or more belongings in the captured image includes detecting the one or more belongings using a detector being learned images which represent the one or more belongings.

23. The non-transitory computer-readable recording medium according to claim 22, wherein the detector contains a learning model which has learned training data composed of one or more image data.

24. The non-transitory computer-readable recording medium according to claim 23, wherein the learning model employs a neural network.

25. The non-transitory computer-readable recording medium according to claim 24, wherein the neural network is a convolutional neural network.

26. The non-transitory computer-readable recording medium according to claim 23, wherein the learning model employs a support vector machine.

27. The non-transitory computer-readable medium according to claim 21,
wherein the processor further performs detecting, based on the image feature of the one or more belongings of a person, one or more first regions, each of which includes the one or more belongings in the captured image; and
wherein determining, based on the one or more first regions and the one or more body parts, the image region where the belonging exists among the one or more body parts.

28. The non-transitory computer-readable medium according to claim 21, wherein the processor further performs:
determining, based on the one or more detected belongings and the one or more body parts, a probability that the one or more belongings is on the one or more body parts.

29. The non-transitory computer-readable medium according to claim 28, wherein the probability is indicated by a numerical value.

30. The non-transitory computer-readable medium according to claim 28, wherein the determining, based on the information related to the one or more detected belongings and the one or more body parts, the image region comprises determining the image region based on the probability.

* * * * *